US008967632B1

(12) United States Patent
Gunsaullus

(10) Patent No.: US 8,967,632 B1
(45) Date of Patent: Mar. 3, 2015

(54) TOOL CART CADDY

(71) Applicant: Scott E. Gunsaullus, Long Grove, IL (US)

(72) Inventor: Scott E. Gunsaullus, Long Grove, IL (US)

(*) Notice: Subject to any disclaimer, the term of this patent is extended or adjusted under 35 U.S.C. 154(b) by 0 days.

(21) Appl. No.: 14/221,926

(22) Filed: Mar. 21, 2014

(51) Int. Cl.
*B62D 39/00* (2006.01)
*B62B 3/00* (2006.01)

(52) U.S. Cl.
CPC ...................................... *B62B 3/002* (2013.01)
USPC ................... 280/33.991; 280/47.34; 280/79.2

(58) Field of Classification Search
CPC ........ B62B 3/007; B62B 3/14; B62B 3/1472; B62B 3/1476; B62B 2202/67; B62B 2202/90
USPC ............... 280/33.991, 33.997, 33.998, 87.01, 280/47.34, 47.35, 79.11, 79.2, 79.5, 79.7
See application file for complete search history.

(56) References Cited

U.S. PATENT DOCUMENTS

| | | | | |
|---|---|---|---|---|
| 5,072,960 A * | 12/1991 | Sperko | ........................ | 280/47.34 |
| 6,073,942 A * | 6/2000 | Heneveld, Sr. | ........... | 280/33.991 |
| 6,698,770 B2 * | 3/2004 | Eriksson et al. | ......... | 280/33.991 |
| 8,132,819 B2 * | 3/2012 | Landau et al. | ............. | 280/47.26 |
| 8,226,092 B2 * | 7/2012 | Oliver | ........................ | 280/47.18 |
| 8,540,255 B2 * | 9/2013 | Young | ........................ | 280/47.35 |
| 2006/0006628 A1 * | 1/2006 | Fields | ........................... | 280/640 |

* cited by examiner

*Primary Examiner* — John Walters
(74) *Attorney, Agent, or Firm* — Mathew R. P. Perrone, Jr.

(57) ABSTRACT

A tool cart caddy suitable for carrying a tool cart as well as tools and materials at a construction site moves easily around a construction site. An especially successful version of this tool cart caddy is as a transport or another cart, such as a cart for an electrician or plumber to transport the required tools and materials around the construction site. The tool cart caddy has a base can both support a cart and carry additional tools or materials. The lower base is generally rectangular with a caster, preferably a lockable caster, mounted at each corner thereof. Thus, the tool cart caddy can be moved on the casters, with the casters being locked or unlocked as desired.

18 Claims, 12 Drawing Sheets

TOOL CART CADDY

This invention relates to a tool cart caddy and more particularly to a tool cart caddy, which greatly simplifies transport of another cart, or tools or materials to a desired work area; and additionally is very suitable for use by an electrician or a plumber.

CROSS REFERENCE TO RELATED APPLICATION

The invention in this application cooperates with the invention in U.S. patent application Ser. No. 13/506,587, entitled Utility Holding Device filed by the same inventor and incorporated herein by reference.

BACKGROUND OF THE INVENTION

Work or construction on any building is inherently dangerous for any worker. For an electrician or a plumber, there is a wide variety of tools and materials that the electrician or a plumber must move to a work area before the electrician or plumber can start, do or complete the desired work. To simplify such movement of material or tools, it is very desirable to have a carrying or holding device, or other apparatus capable of carrying such tools and materials to desired work area.

Due to the wide variety of tools and materials required for an electrician, plumber, or other worker to use; it is difficult to design an appropriate device to accomplish this goal of getting tools or materials to a desired. With the change in materials and design tools, a device, which works for one set of material or tools, may not work for other sets of tools and materials. Thus, it becomes quite difficult to design an appropriate cart caddy for an electrician, a plumber or other worker to use. If the cart caddy is large enough to carry a substantial number of tools and materials, or another tool cart, it is too bulky to use around the construction site. If it is small enough to be easily moved around a construction site, the cart may not be able to handle all of the desired tools and materials for a particular project, let alone move a tool cart caddy to a desired position for use on a phase of the project.

It is also useful if the tool cart caddy can be used with a ladder. In this way, the worker can use a ladder while having material and tools conveniently available. Such convenience provides for both safety and efficiency for the worker, as well as the project itself.

If this cart can cooperate with other implements at the construction site, even more advantages are obtained. For example, if this cart can be used with a ladder, whether the ladder includes a tray or not, great advantages are obtained. If the tool cart caddy can be used with a scaffold or a lift, further advantages are obtained.

Many times, an electrician or plumber is required to use a ladder. If the cart for transporting tools and materials cooperates with the ladder, great advantages are obtained. Not only does the worker become more efficient, safety is promoted. Therefore, a cart, especially a cart suitable for use by an electrician or a plumber, provides many desired results.

So improvements in ladder safety and worker safety can positively enhance working conditions for the workers, and others in and around the construction area. It is very desirable to create a device to accomplish these goals.

SUMMARY OF THE INVENTION

Among the many objectives of the present invention is the provision of a tool cart caddy suitable for transporting tools and materials or other cart around a construction site.

Another objective of the present invention is the provision of a tool cart caddy suitable for carrying tools and materials for an electrician or a plumber.

Yet another objective of the present invention is the provision of a tool cart caddy suitable for carrying tools and materials for an electrician or a plumber, which has adjustable carrying features.

Still, another objective of the present invention is the provision of a tool cart caddy suitable for carrying tools and materials for an electrician or a plumber, which may carry another cart.

Also, an objective of the present invention is the provision of a tool cart caddy suitable for carrying tools and materials at a construction site, which improves worker efficiency.

A further objective of the present invention is the provision of a tool cart caddy suitable for carrying tools and materials at a construction site, which improves worker safety.

A still further objective of the present invention is the provision of a tool cart caddy suitable for cooperating with a ladder.

These and other objectives of the invention (which other objectives become clear by consideration of the specification, claims and drawings as a whole) are met by providing a tool cart caddy suitable for carrying tools and materials at a construction site as well as a tool cart. The tool cart caddy is especially useful for carrying tools and materials for a worker as well. The wheels, at each of the four corners of the cart provide mobility, for the entire assembly.

BRIEF DESCRIPTION OF DRAWINGS

Throughout the figures of the drawings, where the same part appears in more than one figure of the drawings, the same number is applied thereto.

DESCRIPTION OF THE PREFERRED EMBODIMENTS

Figure 1:
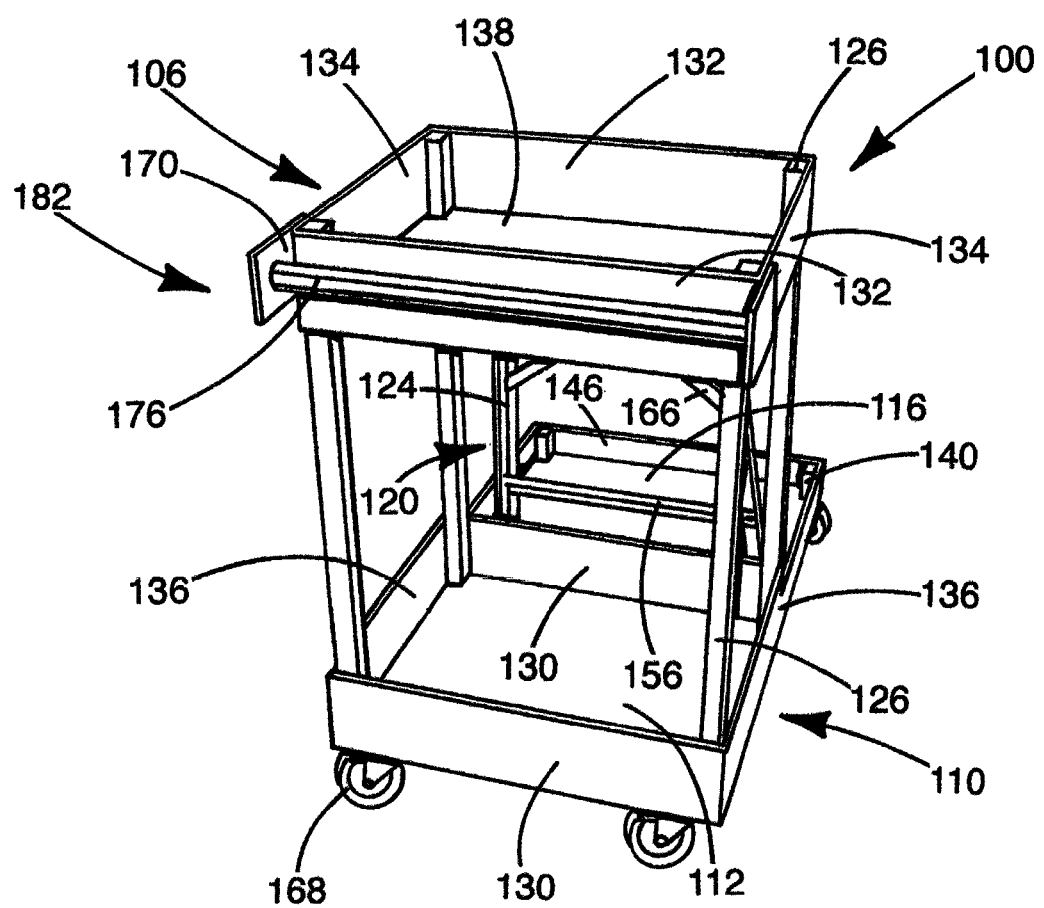
FIG. 1 depicts a rear perspective view of the tool cart caddy 100 of this invention.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the invention in any manner. The words attach, connect, couple, and similar terms with their inflectional morphemes do not necessarily denote direct or intermediate connections, but may also include connections through mediate elements or devices.

The tool cart caddy of this invention provides many great advantages, especially in the construction and plumbing industries. An especially successful version of this tool cart caddy is as a transport or another cart, such as a cart for an electrician or plumber to transport the required tools and materials around the construction site. The tool cart caddy has a lower base or bottom tray base, which can both support a cart and carry additional tools or materials above those on the cart.

The lower base is generally rectangular with a caster, preferably a lockable caster, mounted at each corner thereof. Thus, the casters can be moved the tool cart caddy casters, with the casters being locked to tool cart caddy in desired position or unlocked as desired to move the cart caddy. Also, the tool cart may be removed from this tool cart caddy. This tool cart may then be releasably secured to a desired surface. This surface may be ladder, a scaffold, or other suitable surface.

Figure 2:
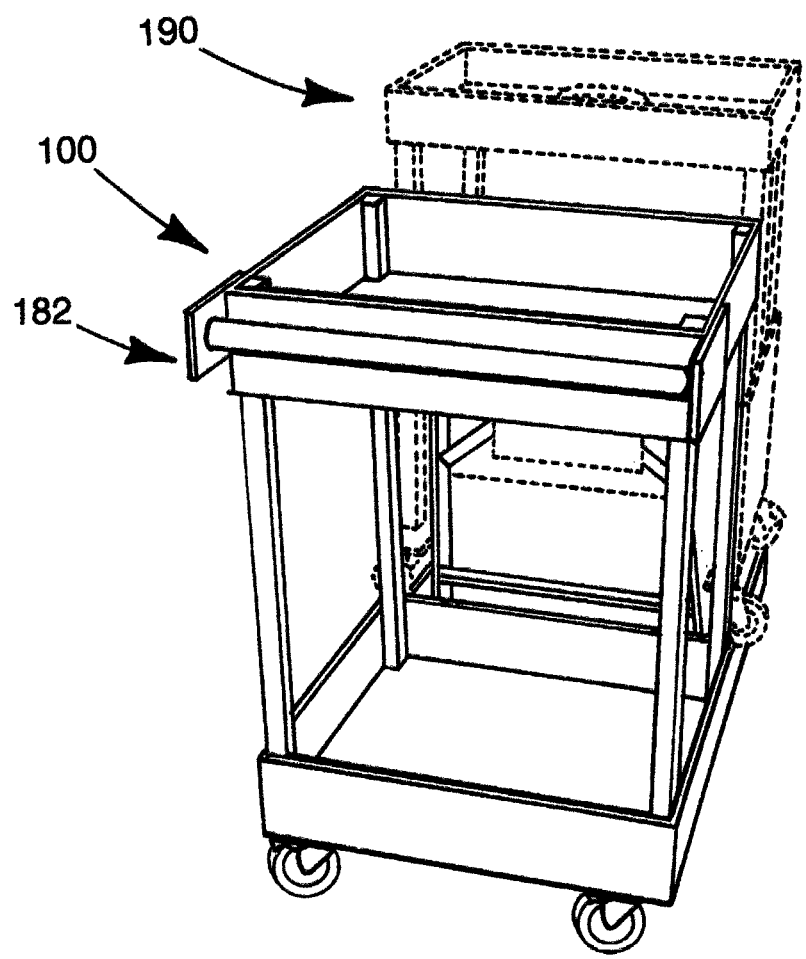
FIG. 2 depicts a rear perspective view of the tool cart caddy 100 of this invention, with tool cart 190 shown in phantom on the tool cart caddy 100 as a reverse view of FIG. 1.

Referring now to FIG. 1 and FIG. 2, the tool cart caddy 100 is very suitable for transporting tool cart 190. Tool cart 190 is more clearly defined in U.S. patent application Ser. No. 13/506,587, entitled Utility Holding Device by the same inventor, incorporated herein by reference.

Tool cart caddy 100 has a top tray 106 and a bottom tray 110, viewable from back side 182. Bottom tray 110 includes a bottom tray base 112, which extends into a caddy receiving base 116. Around bottom tray base 112 are a pair oppositely disposed bottom tray sides 130 and oppositely disposed bottom base sides 136. In this fashion, items such as tools or materials may be contained therein, because of the thus formed container or bottom tray 110.

From bottom tray 110, four of riser leg 126 extend from each corner thereof to support top tray 106. Surrounding top tray 106 are pair of oppositely disposed top tray sides 132 and oppositely disposed top base sides 134. With top tray base 138, top tray 106 is complete.

Extending from bottom tray 110 is mounting base 116 for the tool cart 190. Short side 146 finishes the mounting base 116 of tool cart caddy 100 and is supported by corner blocks 140. Such a structure supports the tool cart 190 on tool cart caddy 100.

Figure 3:
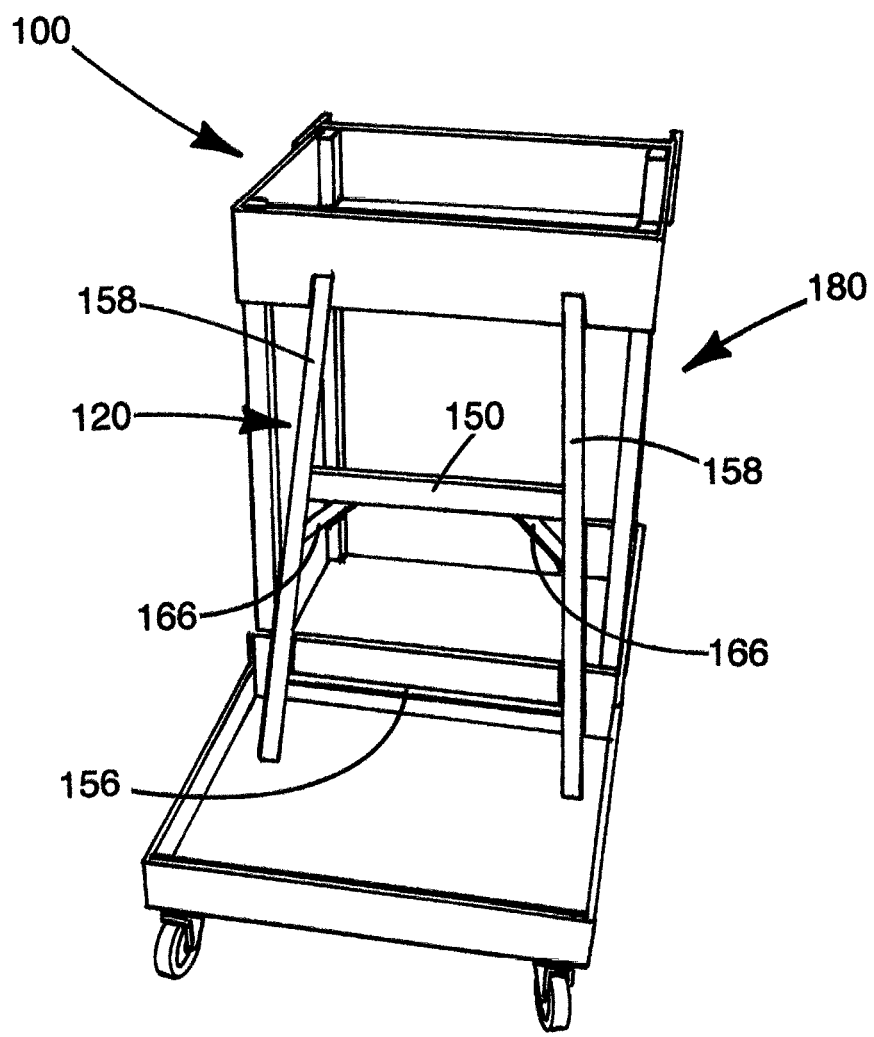
FIG. 3 depicts a front view of the tool cart caddy 100 of this invention.
Figure 4:
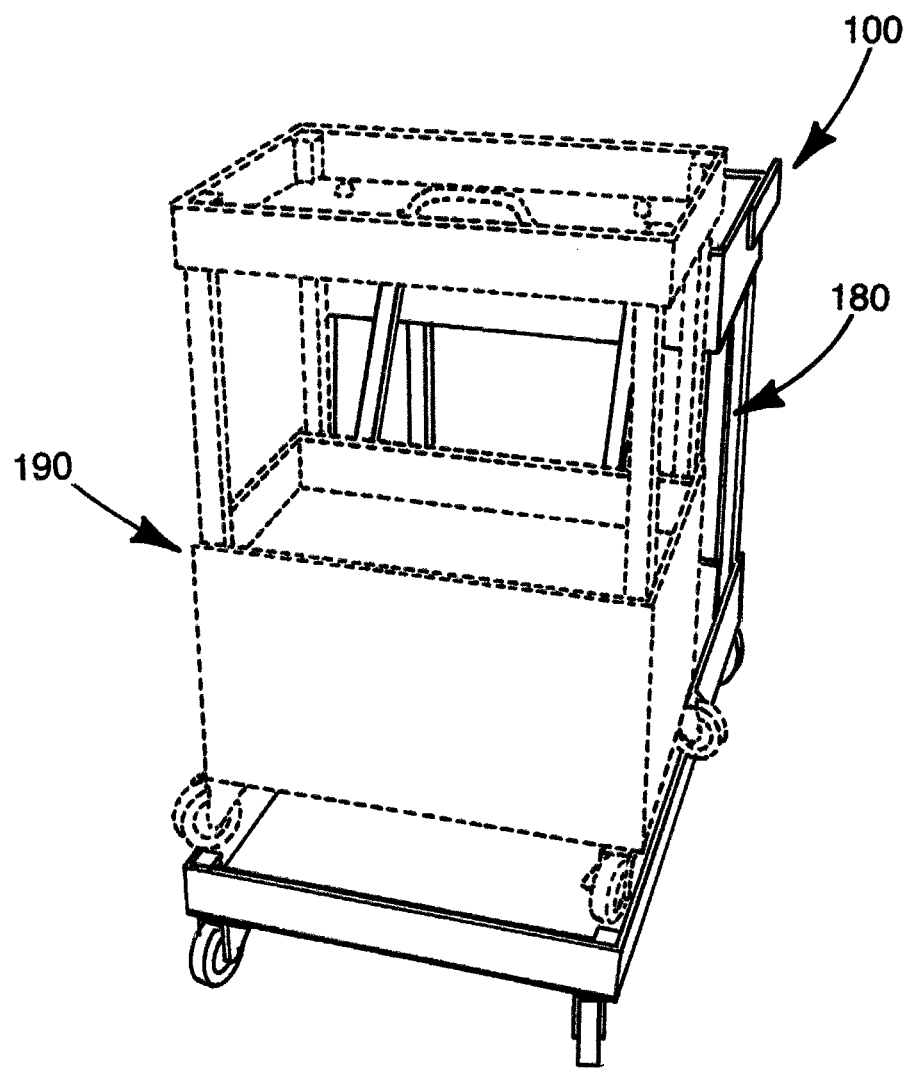
FIG. 4 depicts a front view of the tool cart caddy 100 with tool cart 190 shown in phantom on the tool cart caddy 100.
Figure 5:
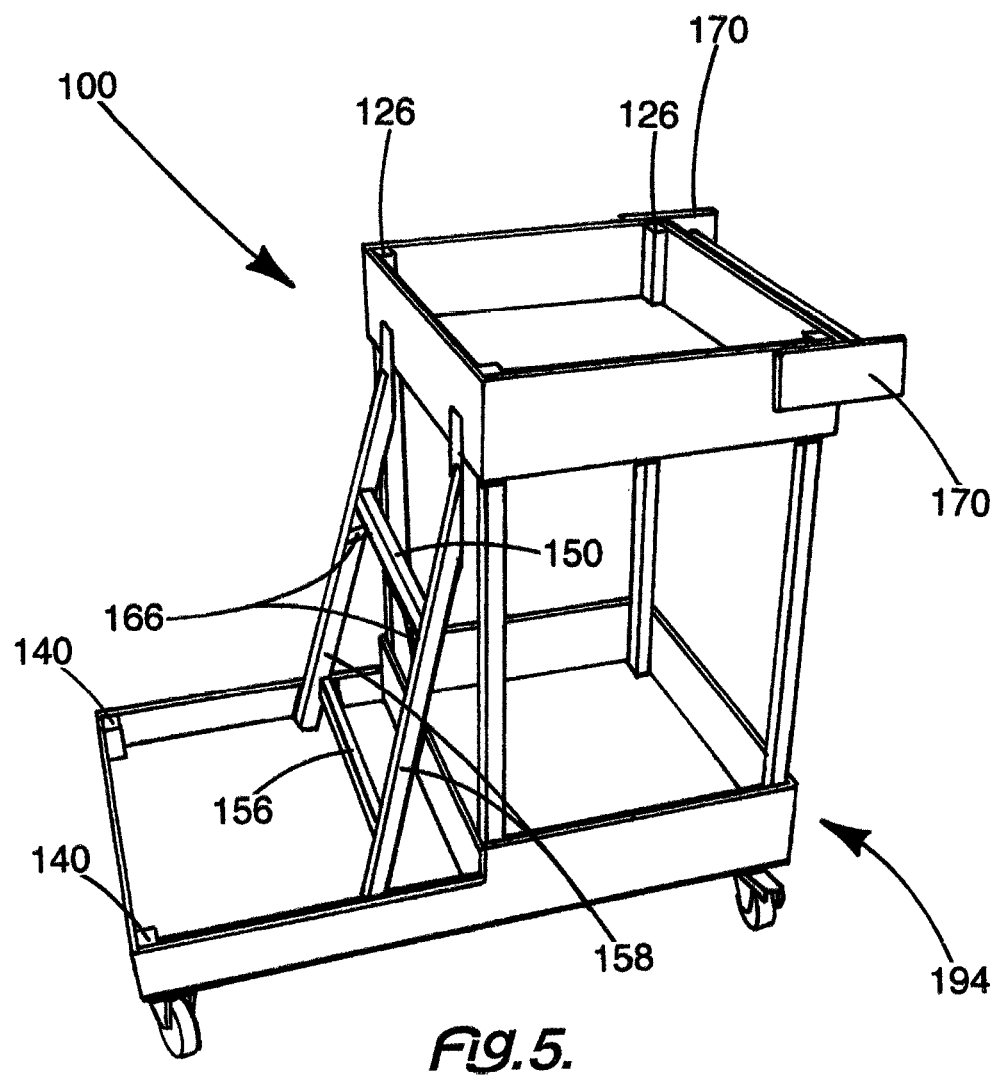
FIG. 5 depicts a side, perspective view of the tool cart caddy 100.
Figure 6:
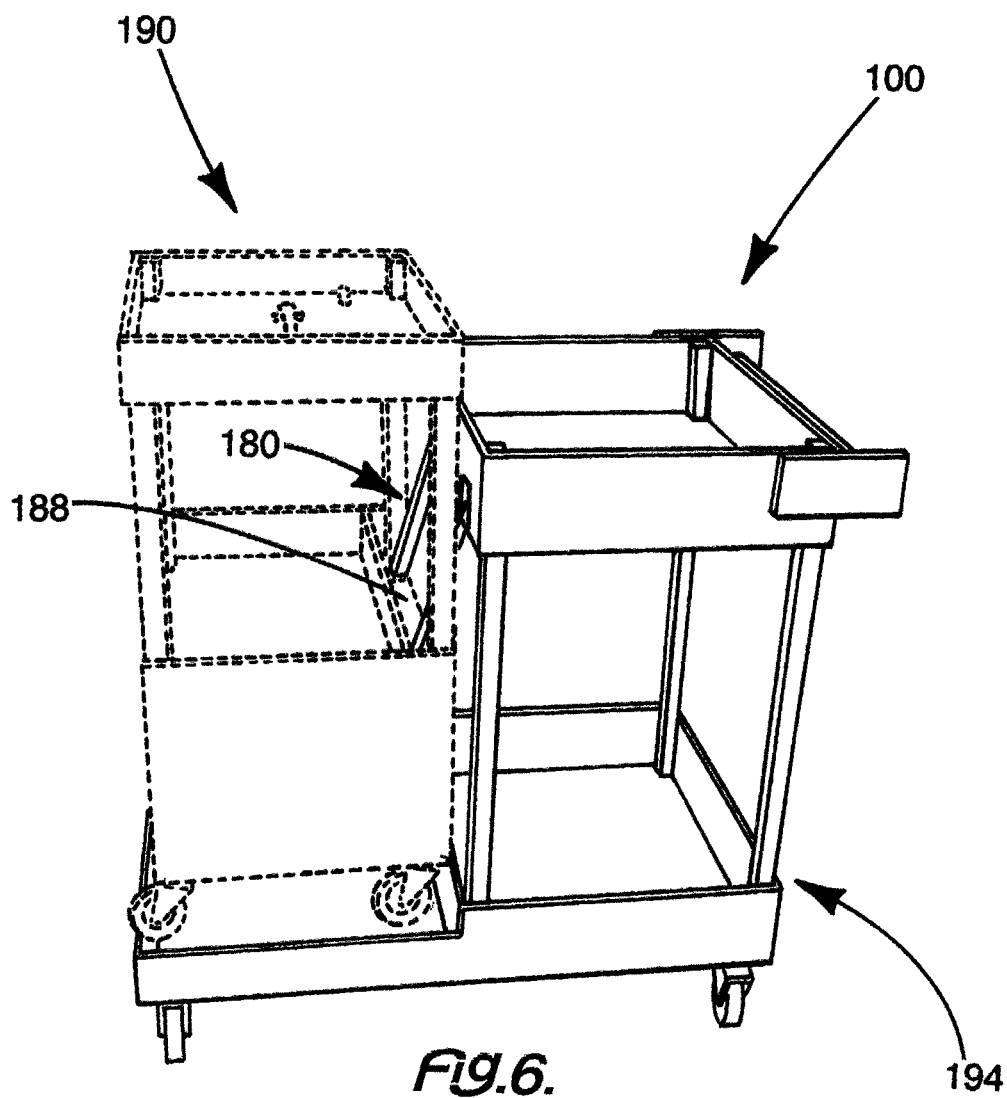
FIG. 6 depicts a side, perspective view of the tool cart caddy 100 based on FIG. 5 with tool cart 190 drawn in phantom, supported thereon.
Figure 7:
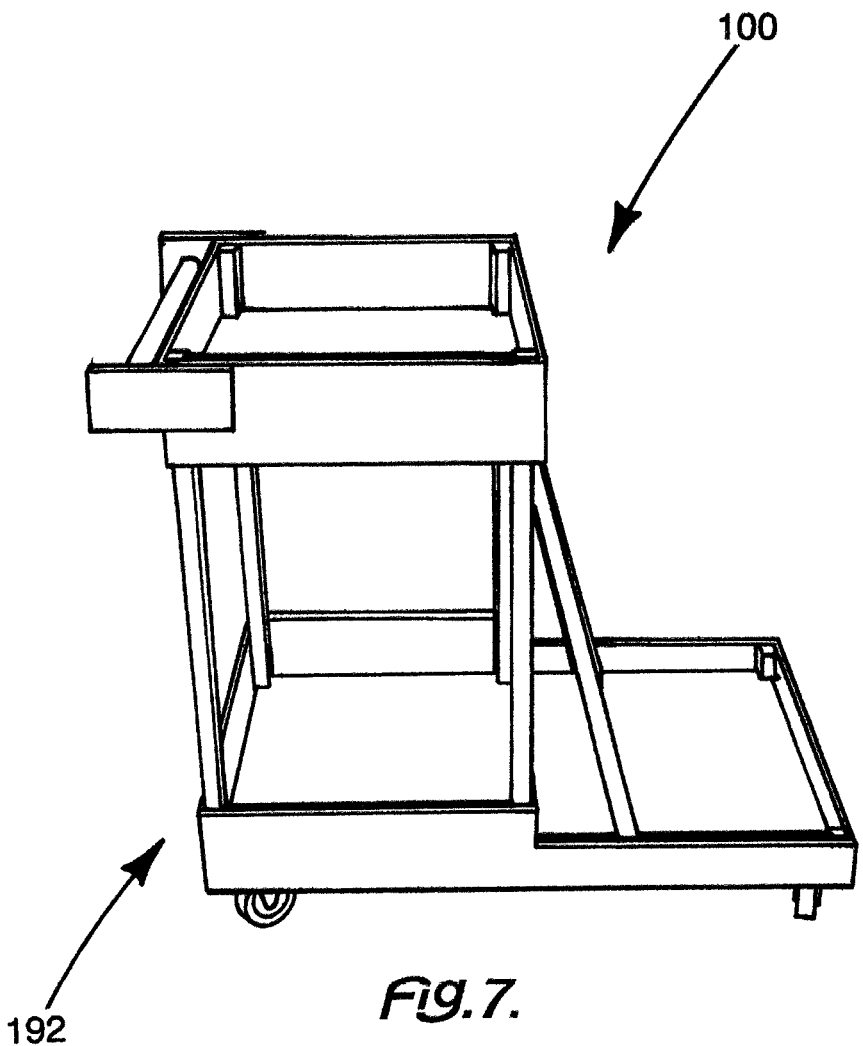
FIG. 7 depicts a side, perspective view of the tool cart caddy 100 as a reverse view of FIG. 5.
Figure 8:
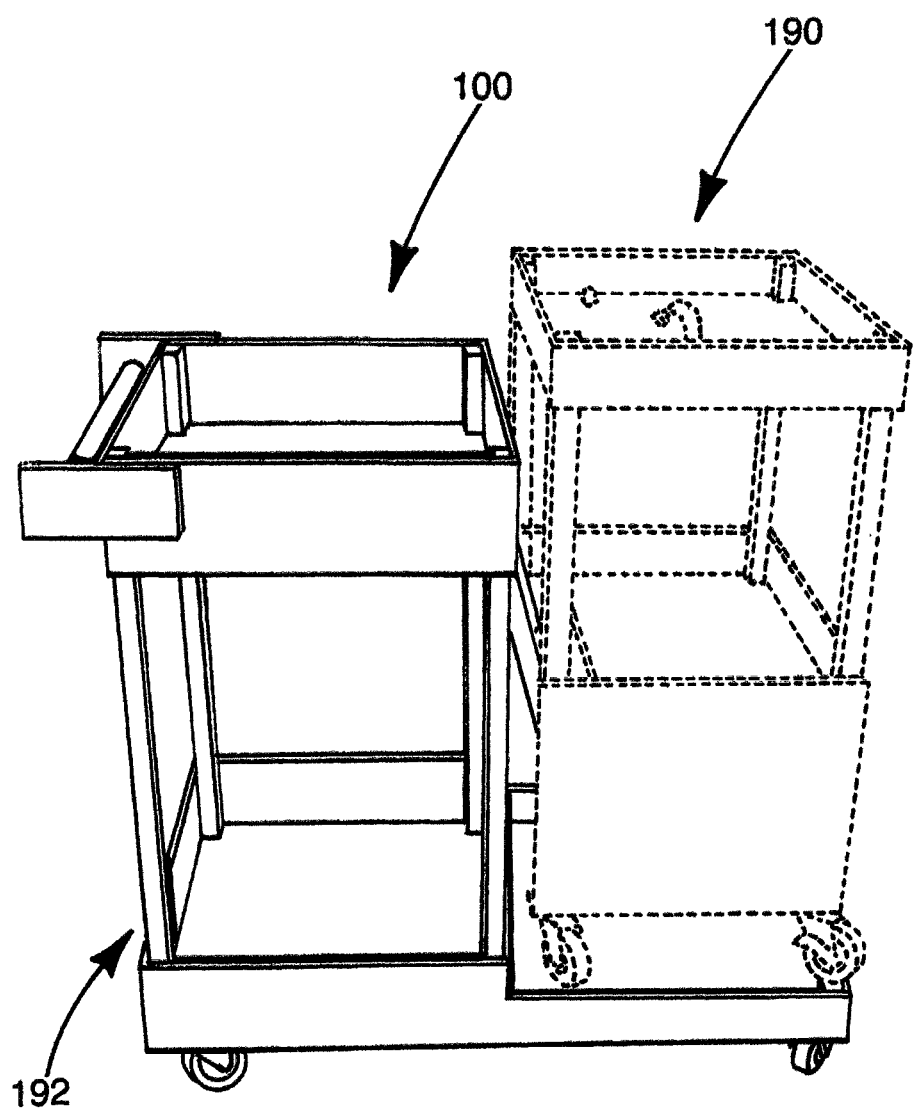
FIG. 8 depicts a side, perspective view of the tool cart caddy 100 based on FIG. 7 with tool cart 190 drawn in phantom, supported thereon.

Angle mount frame 120 extends from the mounting base 116 to the top tray 106. Angle mount frame 120 has an angle riser leg 158 extending upwardly or vertically on each side thereof. Top cross member 150 (FIG. 3) connects the two angle riser legs 158, as does bottom cross member 156. Top cross member 150 is above bottom cross member 156 and below top tray 106. A pair of angle struts 166 connects each of angle riser legs 158 to top cross member 150.

A caster 168 is at each corner of tool cart caddy 100 on the bottom of bottom tray 110. Thus, they are usually four of caster 168 on the tool cart caddy 100. One or more of caster 168 may be lockable or free rolling, as desired.

A handle bracket 170 extends from each of top tray sides 132 to form a support for handle 176 on top tray 106 oppositely disposed from angle mount frame 120. In each of handle bracket 170 is supported an end of handle 176. Thus, angle mount frame 120 is on the front side 180 of tool cart 100 while handle 176 is on the back side 182 thereof.

Adding FIG. 3, FIG. 4, FIG. 5, FIG. 6, FIG. 7, and FIG. 8 to the consideration, and comparing these figures to the above discussed figures, the structure of tool caddy 100 becomes even more clear. The angle mount frame 120 has top cross member 150 above bottom cross member 156 and supported by two of angle strut 166. Side legs 158, in a pair, support each of top cross member 150 and bottom cross member 156 and are connected thereby.

Casters 168 support and provide movement for tool caddy 100, as seen from front side 180. Tool cart 190 is easily placed on tool caddy 100 at the front side 180 thereof for transport therewith to a desired location.

From front side 180, angle mount frame 120 engages tool cart mount bracket 188 of tool cart 190 with top cross member 150 of tool cart caddy 100. Tool cart 190 fits thereon appropriately. From the right caddy side 192 (FIG. 7) and the left caddy side 194 (FIG. 6 and FIG. 8) the structure of tool cart caddy 100 becomes clear.

Figure 9:
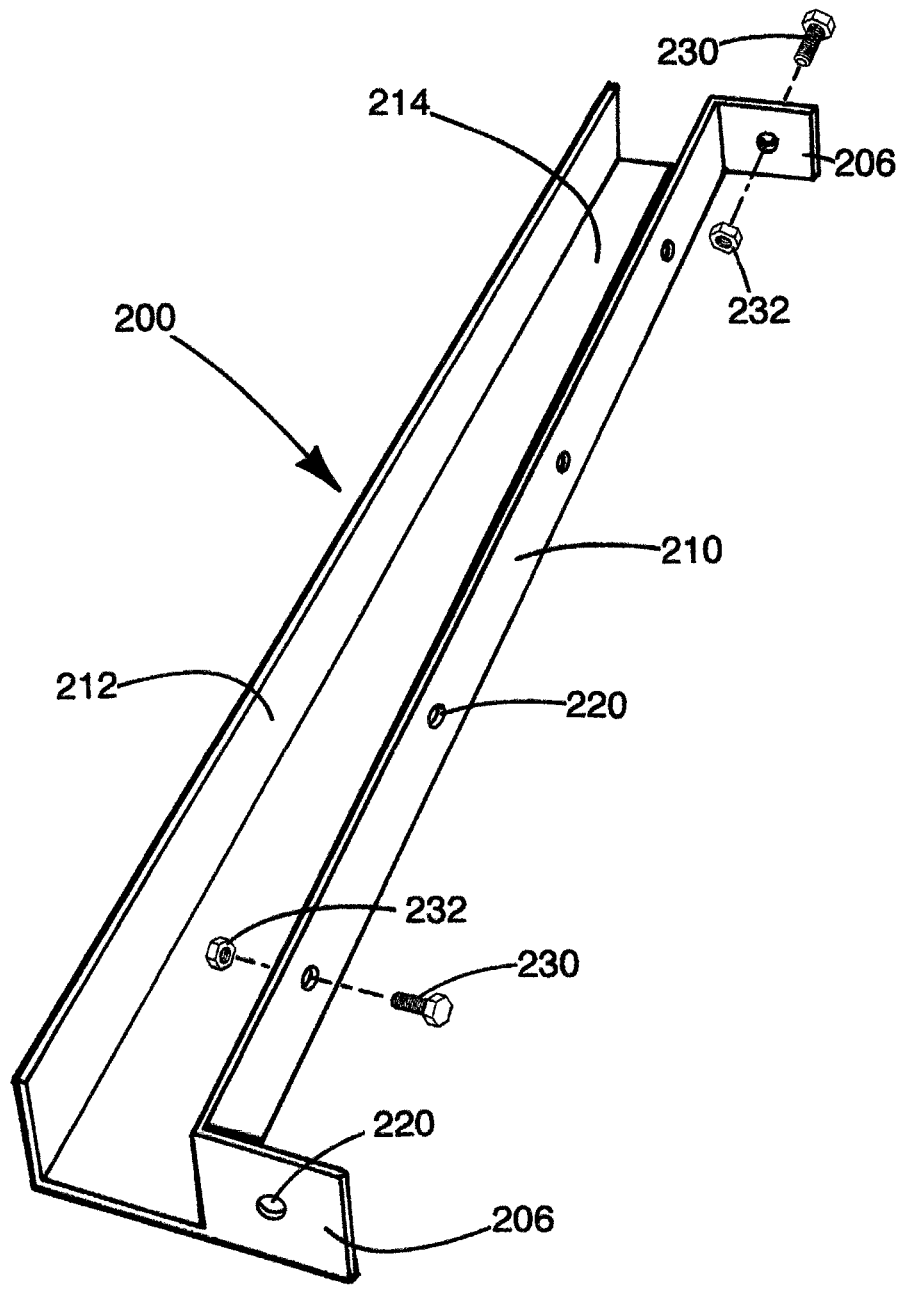
FIG. 9 depicts a perspective view of a ladder or a tubing tray 200 for the tool cart caddy 100.

Turning now to FIG. 9, to tool cart caddy 100, support tray 200 may be added. Support tray 200 includes an elongated member 206 with a mount side 210 and an outer side 212. Cradle base 214 acts as the base of the square U-shape of support tray 200 and completes the elongated member 206 with mount side 210 and outer side 212. Within mount side 210 are bolt apertures 220 to receive bolt 230 and be secured to tool cart caddy 100 by nut 232. Mount side 210

Figure 10:
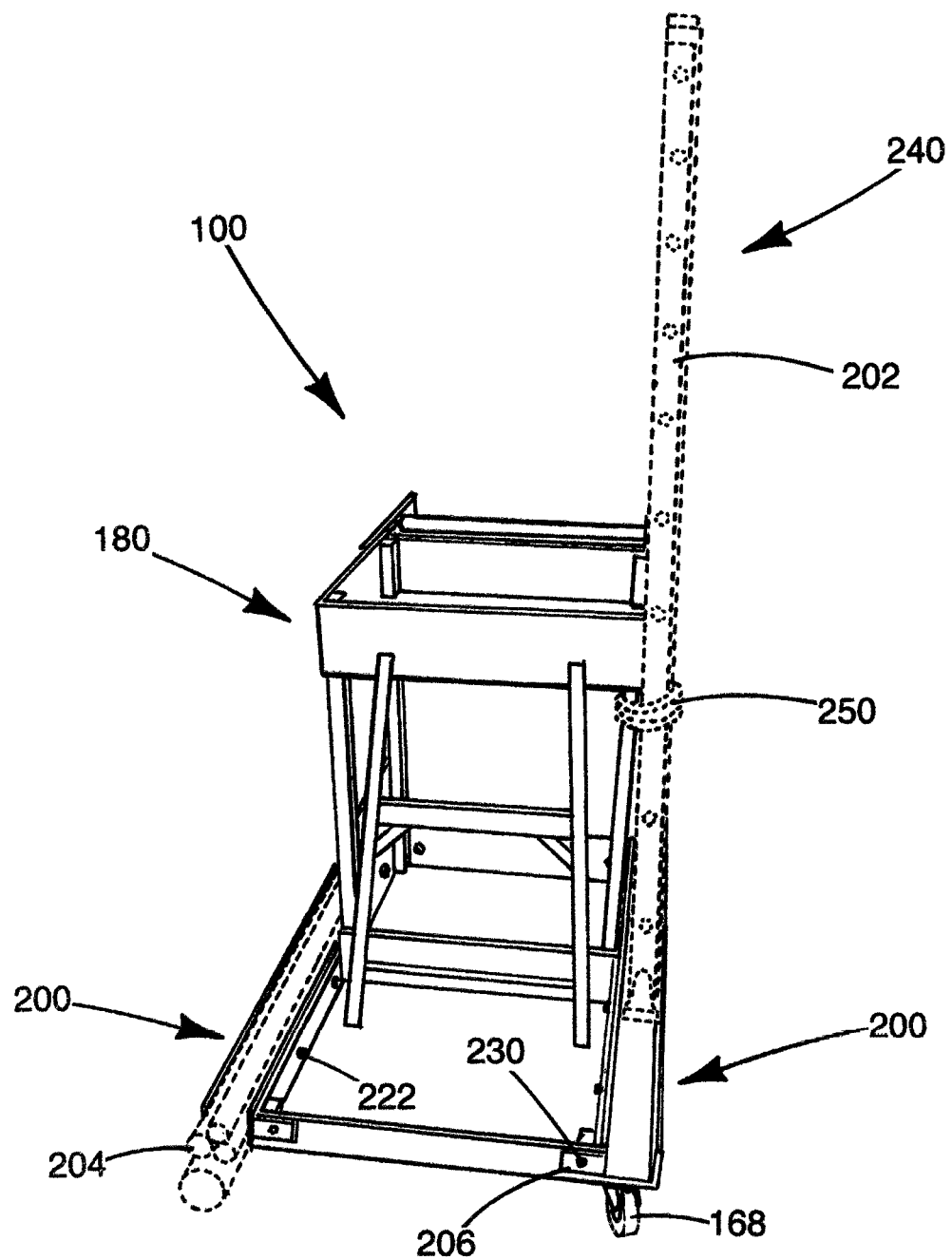
FIG. 10 depicts a front, perspective view of a front side 180 of tool cart caddy 100 with a support tray 200 suitable for serving as a ladder or a tubing tray mounted on each side thereof, with vertical ladder 240 and tubing 204 resting in support tray 200 on opposite sides of tool caddy 100, provided that, when adding support tray 200 to tool cart caddy 100, caster 168 is moved out at each corner under ladder to tubing tray 200 for greater stability and load bearing for tool caddy 100.
Figure 11:
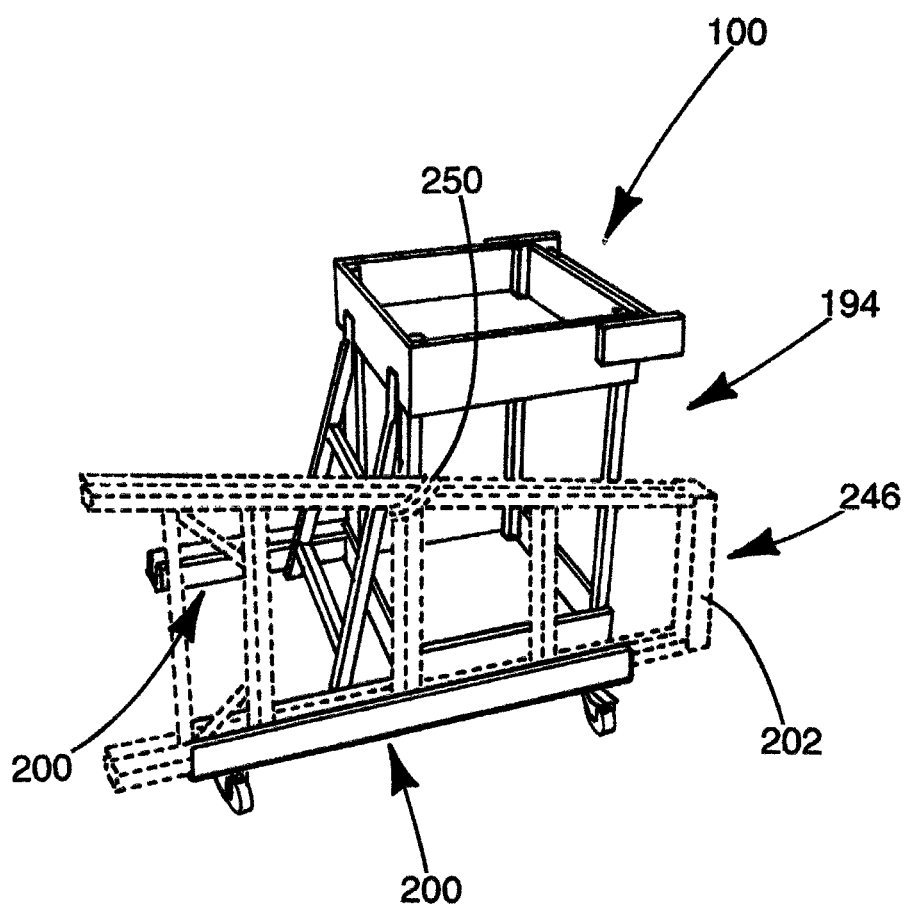
FIG. 11 depicts a left side 194 of tool cart caddy 100 with horizontal ladder 246 resting in support tray 200 suitable for serving as a ladder or a tubing tray and being tied with bungee cord 250 at opposite end.
Figure 12:
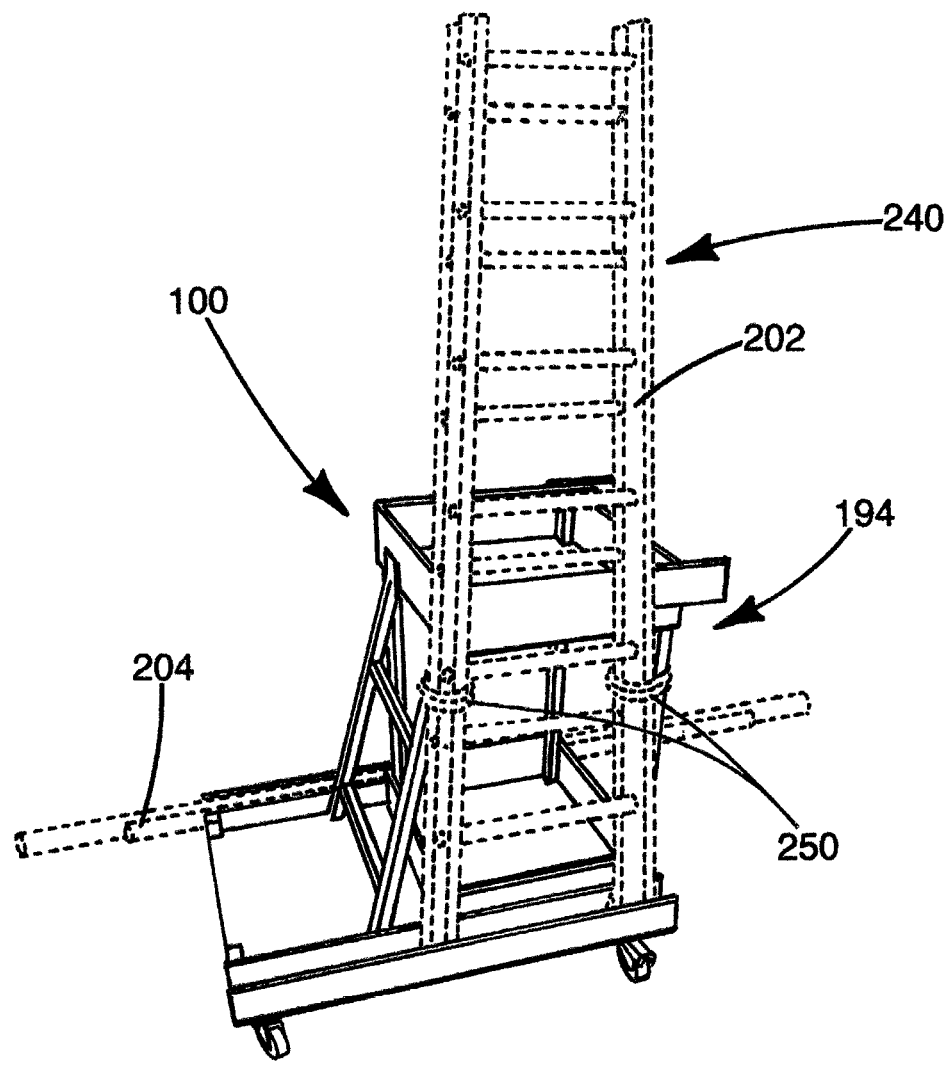
FIG. 12 depicts a left side 194 of tool cart caddy 100 with vertical ladder 240 drawn in phantom standing in support tray 200 and bound on the left and right sides by bungee cord 250.

By now adding FIG. 10, FIG. 11, and FIG. 12 to the consideration of FIG. 9, it can be seen how support tray 200 is added to tool cart caddy 100. Tool cart caddy 100 has support tray 200 mounted on each side thereof, with vertical ladder 240 and tubing 204 resting in support tray 200 on opposite sides of tool caddy 100 (FIG. 10). When one adds the support tray 200 to tool cart caddy 100, each caster 168 is preferably moved out at each corner to a position under tubing tray 200 for greater stability and load bearing capacity for tool cart caddy 100.

Support tray 200 can receive either ladder 202 or tubing 204. The flanges 206 at each end of the mount side 210 also have bolt apertures 220 as mount side 210. Each corresponding aperture 220 adjoins or aligns with a corresponding caddy aperture 222 to receive a bolt 230 with a corresponding nut 232 in order to secure support tray 200 to tool cart caddy 100. Vertical ladder 240 (FIG. 10 and FIG. 12) can be received in support tray 200. Bungee cord 250 secures a vertical ladder 240. Likewise, horizontal ladder 246 (FIG. 11) can be secured to tool cart caddy 100 by bungee cord 250. Thus ladder 202 can be either horizontal ladder 246 or vertical ladder 240.

This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this tool can become clear to a person having ordinary skill in this particular art. Such modifications are clearly covered by this disclosure.

What is claimed and sought to be protected by Letters Patent is:

1. A tool cart caddy for transporting a tool cart or at least one tool or material to a work area comprising:
   a) the tool cart caddy having a bottom tray;
   b) the bottom tray being supported on casters;
   c) the bottom tray being adapted to receive a tool cart thereon;
   d) the tool cart caddy having a top tray above the bottom tray;
   e) at least one riser extending from the bottom tray to support the top tray;
   f) the bottom tray including a bottom tray base;
   g) the bottom tray base extending into a mounting base;
   h) the bottom tray base including a pair of oppositely disposed bottom tray sides and a pair of oppositely disposed bottom base sides, thereby forming four corners of a container having the shape of a rectangle; and
   i) a riser leg extending from each of the four corners in order to support a top tray.

2. The tool cart caddy of claim 1 further comprising:
   a) the top tray including a pair of oppositely disposed top tray sides, a pair oppositely disposed top base sides, and a top tray base;
   b) a mounting base extending from the bottom tray;
   c) the mounting base being adapted to receive the tool cart;
   d) a short side finishing the mounting base of tool cart caddy; and
   e) the short side being supported by corner blocks in order to support the tool cart on the tool cart caddy.

3. The tool cart caddy of claim 2 further comprising:
   a) an angle mount frame extending from the mounting base to the top tray;
   b) the angle mount frame having a pair of angle riser legs, each member positioned on opposing sides thereof;
   c) the angle mount frame having a top cross member and a bottom cross member to connect the pair of angle riser legs;
   d) the top cross being positioned above the bottom cross member and below the top tray; and
   e) a pair of angle struts connecting each of angle riser legs to the top cross member.

4. The tool cart caddy of claim 3 further comprising:
   a) a caster being secured at each corner of tool cart caddy between a floor surface and the bottom tray for a total of four casters; and
   b) the casters being lockable or free rolling.

5. The tool cart caddy of claim 4 further comprising:
   a) the top tray sides extend to form a first handle bracket and a second handle bracket;
   b) the first handle bracket and the second handle bracket being oppositely disposed from angle mount frame; and
   c) each of the first handle bracket and the second handle bracket receiving an end of a handle for the tool cart caddy.

6. The tool cart caddy of claim 5 further comprising:
   a) a support tray suitable for serving as a ladder tray or a tubing tray being added to the tool cart caddy;
   b) the support tray having an elongated member;
   c) the elongated member having a cradle base, amount side and an outer side; and
   d) the cradle base forming a square U-shape for the elongated member with the mount side and the outer side.

7. The tool cart caddy of claim 6 further comprising:
   a) the mount side having at least one bolt aperture to receive a bolt and be secured to the tool cart caddy by a nut;
   b) the support tray being capable of receiving a tool or material; and
   c) the tool cart caddy having at least one of the support tray on opposing sides thereof.

8. The tool cart caddy of claim 7 further comprising:
   a) a vertical ladder resting in one of the support tray; and
   b) a set of tubing resting in one of the support tray.

9. The tool cart caddy of claim 8 further comprising:
   a) a vertical ladder or a horizontal ladder resting in one of the support tray;
   b) the vertical ladder or the horizontal ladder being secured by a bungee cord; and
   c) the casters being secured at each corner of tool cart caddy on the support.

10. In a tool cart caddy for transporting a tool cart or at least one tool or material to a work area, the improvement comprising:
    a) the tool cart caddy having a bottom tray;
    b) the bottom tray being supported on casters;
    c) the bottom tray being adapted to receive a tool cart thereon;
    d) the tool cart caddy having a top tray above the bottom tray;
    e) at least one riser extending from the bottom tray to support the top tray;
    f) the bottom tray including a bottom tray base;
    g) the bottom tray base extending into a caddy receiving base;
    h) the bottom tray base including a pair of oppositely disposed bottom tray sides and a pair of oppositely disposed bottom base sides, thereby forming four corners of a container having the shape of a rectangle; and
    i) a riser leg extending from each of the four corners in order to support a top tray.

11. The tool cart caddy of claim 10 further comprising:
    a) the top tray including a pair of oppositely disposed top tray sides, a pair oppositely disposed top base sides, and a top tray base;
    b) a mounting base extending from the bottom tray;
    c) the mounting base being adapted to receive the tool cart;
    d) a short side finishing the mounting base of tool cart caddy; and
    e) the short side being supported by corner blocks in order to support the tool cart on the tool cart caddy.

12. The tool cart caddy of claim 11 further comprising:
    a) an angle mount frame extending from the mounting base to the top tray;
    b) the angle mount frame having a pair of angle riser legs, each member positioned on opposing sides thereof;
    c) the angle mount frame having a top cross member and a bottom cross member to connect the pair of angle riser legs;
    d) the top cross being positioned above the bottom cross member and below the top tray; and
    e) a pair of angle struts connecting each of angle riser legs to the top cross member.

13. The tool cart caddy of claim 12 further comprising:
a) a caster being secured at each corner of tool cart caddy between a floor surface and the bottom tray for a total of four casters; and
b) the casters being lockable or free rolling.

14. The tool cart caddy of claim 13 further comprising:
a) the top tray sides extend to form a first handle bracket and a second handle bracket;
b) the first handle bracket and the second handle bracket being oppositely disposed from angle mount frame; and
c) each of the first handle bracket and the second handle bracket receiving an end of a handle for the tool cart caddy.

15. The tool cart caddy of claim 14 further comprising:
a) a support tray suitable for serving as a ladder tray or a tubing tray being added to the tool cart caddy;
b) the support tray having an elongated member;
c) the elongated member having a cradle base, a mount side and an outer side;
d) the cradle base forming a square U-shape for the elongated member with the mount side and the outer side.

16. The tool cart caddy of claim 15 further comprising:
a) the mount side having at least one bolt aperture to receive a bolt and be secured to the tool cart caddy by a nut;
b) the support tray being capable of receiving a tool or material; and
c) the tool cart caddy at least one of the support tray on opposing sides thereof.

17. The tool cart caddy of claim 16 further comprising:
a) a vertical ladder resting in one of the support tray; and
b) a set of tubing resting in one of the support tray.

18. The tool cart caddy of claim 17 further comprising:
a) a vertical ladder or a horizontal ladder resting in one of the support tray;
b) the vertical ladder or the horizontal ladder being secured by a bungee cord; and
c) the casters being secured at each corner of tool cart caddy on the support.

\* \* \* \* \*